April 16, 1963　　　C. E. JENNINGS　　　3,085,975
PROCESS FOR TREATING WATER
Filed April 30, 1959
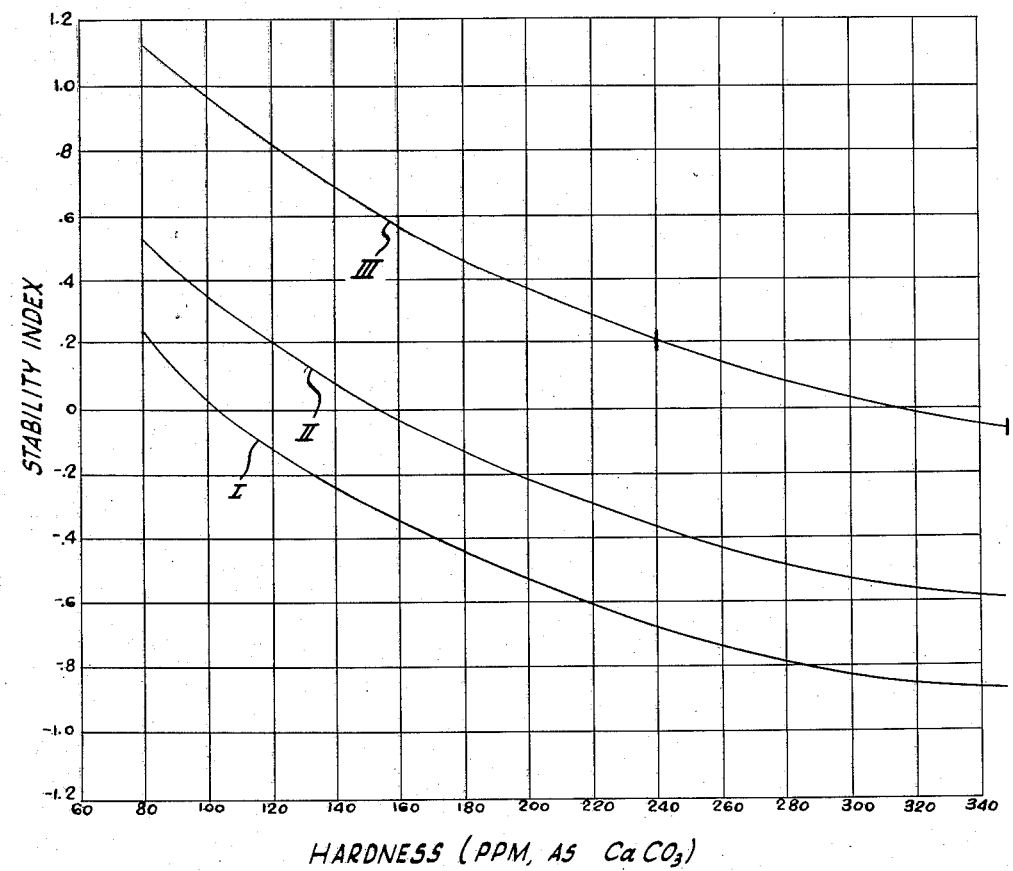
INVENTOR.
CHARLES E. JENNINGS
BY
Attorneys United States Patent Office 3,085,975
Patented Apr. 16, 1963

3,085,975
PROCESS FOR TREATING WATER
Charles E. Jennings, Downey, Calif., assignor to Aqua-Serv Engineers, Inc., a corporation of California
Filed Apr. 30, 1959, Ser. No. 809,965
2 Claims. (Cl. 210—58)

This invention relates generally to the prevention of scale formation, and the prevention of corrosion, in equipment in which water is being evaporated. More specifically, this invention relates to the prevention of scale formation and corrosion in equipment employing evaporation of water, such as evaporative air-coolers or evaporative air-conditioning equipment.

By way of definition, the term "hardness" as used in this disclosure, and in the claims, denotes soap hardness determined by titrating the water with a standard soap solution until a permanent lather is formed, the results being recorded as parts per million calcium carbonate ($CaCO_3$). Total alkalinity of a water is determined by titrating the water with a standard acid in the presence of a methyl orange indicator, the results being recorded as parts per million calcium carbonate.

In conventional evaporative gas or air-cooling systems, water is continuously circulated into heat-transfer relationship with hotter gas or air, and as the water evaporates, the gas or air is cooled. The water that is not evaporated is recirculated and passes into heat-transfer relationship with hotter gas or air, and as the water evaporates, the gas or air is cooled. The water that is not evaporated is recirculated and passes into heat-transfer relationship with additional hotter gas and air, further water thus evaporating. As the water is evaporated, the water remaining in the equipment has ever increasing scale-forming tendencies due to the increase in concentration of the dissolved salts which are responsible for hardness in water.

In many cities, it is required by law that a substantial specified amount of the cooling water, entering the evaporative air-cooling or air-conditioning equipment and the like, must be evaporated. For example, in the city of Los Angeles, the requirement made is that two-thirds of the entering water must be evaporated. Conservation of water and sewer overloading are the chief reasons for this requirement. In practice, this means that untreated (i.e. not softened) water, initially entering the cooling system at a hardness that generally runs about 60–80 p.p.m. (parts per million), must be concentrated to a hardness of about 240 p.p.m., and higher, by evaporation, before being discharged from the cooling system.

The scale-forming tendencies of water having this hardness are very substantial, even with the addition of the best available scale-suppressing compounds, complexing, chelating or calcium-sequestering agents. The various polyphosphoric acid compounds, including pyrophosphates, metaphosphates, and complex phosphates, are excellent scale inhibitors. Of these, especially suitable are the alkali polyphosphates such as:

Sodium hexametaphosphate $(NaPO_3)_6$
Complex phosphate $(Na_9P_7O_{22})$
Tetra sodium pyrophosphate $(Na_4P_2O_7)$
Disodium pyrophosphate $(Na_2H_2P_2O_7)$
Sodium tetraphosphate $(Na_6P_4O_{13})$ The polyphosphates are generally added alone or together with a protective organic compound, such as the tannins, gelatin, starch, and a lignin derivative, such as sodium lignin sulfonate. The organic protective compounds may also be used to inhibit scale deposition by themselves. All of these types of agents are generically described herein and in the claims as scale-deposition inhibitors. These scale-deposition inhibitors herein utilized all possess the chemical property of not causing any precipitation of the calcium or magnesium scale-forming constituents, when added below certain specified amounts.

It has been found that by increasing the pH (making the water more alkaline), the solubility of the calcium and magnesium scale-forming constituents in the water is decreased, and the scale-deposition inhibitors are substantially more effective than if the pH had not been altered.

Attempts to reduce the pH of continuously circulating water, as in evaporative cooling equipment, by means of the introduction of liquid acid into the water, have met with relatively little success because this method of introduction of acid has not been practical. The best of the liquid acids is found to be sulphuric, and sometimes muriatic acid. These acids are, of course, hazardous to handle. Even more important, these acids, as with any of the liquid acids, require delicate and expensive metering equipment so that the proper pH can be maintained in the recirculating and make-up water in the evaporative system.

In view of the foregoing facts, it is a major object of the present invention to provide a relatively inexpensive and simplified process wherein the deposition of scale in water-treating equipment and the like, during evaporation of the water therein, is substantially prevented.

It is another object of the invention to provide a process which substantially reduces the scale-forming tendencies on evaporative cooling equipment and the like during evaporation of water therein, by reducing the pH of the circulating water, in the presence of one or more scale-deposition inhibitors, in a substantially improved manner.

Further objects and advantages of my improved process will become clearly understood by referring to the following description and to the accompanying FIGURE in which are shown the scale-forming tendencies of various treated waters as they become more concentrated, in terms of calcium carbonate hardness. The FIGURE depicts the scale-forming tendency when utilizing the process of my invention in comparison to the scale-forming tendency of the same water when not employing the process of my invention.

In general, my invention comprises the addition of a dry solid acid, such as sulfamic acid or citric acid, to the water employed in the evaporative cooling equipment. The water is generally preferably also treated with solid polyphosphates, as well as a solid protective compound such as the tannins or the soluble lignin derivatives. Thus, the entire amount of the additives may be added, in pellet or other solid form, over a continuous period of time, without the need for expensive liquid-metering equipment. For example, a manually operated feeding mechanism containing polyphosphate, the organic protective compound, and the solid acid intermixed in predetermined proportions, depending upon the initial inlet water conditions, can be used to dispense the solids. It will be understood that, while a polyphosphate-organic protective compound-solid acid is the preferred combination, other combinations of solid scale-deposition inhibitors and solid acid may also be used. For example, a solid mixture of petroleum sulfonates (e.g. sodium sulfonate) with a water-soluble calcium sequestering agent (such as the polyphosphate, tetrasodium pyrophosphate or sodium hexametaphosphate) and with a solid acid, such as sulfamic or citric acid, can also be employed with advantageous results.

Turning now to further discussion of the preferred system, and with reference particularly to the FIGURE, the curves shown illustrate the very great advantage of my invention over prior art systems.

The ordinate of the figure is the Stability Index, calculated from the Ryznar Index. The Stability Index is a measure of the tendency of the water to form scale. A Stability Index of zero means that the water is neither scale-forming, nor does it contain corrosive materials. A positive number indicates that the corrosive materials present increase while a negative Stability Index number indicates an increase in scale-forming tendency.

The inlet water used for the calculations of Stability Index had the following analysis initially (prior to any evaporation in the cooling system):

|  | P.p.m. |
|---|---|
| Calcium hardness (as $CaCO_3$) | 80 |
| Total alkalinity (as $CaCO_3$) | 120 |

Referring now particularly to curve numbered I of the FIGURE, this curve represents a plot of Stability Index versus calcium hardness in p.p.m. (the hardness of the water increasing as the water in the cooling system is evaporated). The following is the composition of the scale-deposition inhibitor added to the inlet water added to the evaporative cooling system:

|  | P.p.m. |
|---|---|
| Complex phosphate | 4 |
| Sodium lignin sulphonate | 8 |

It will be noted that the scale-forming tendencies rapidly increase as the hardness of the recirculating water increases from about 105 p.p.m. to 350 p.p.m. In the range of hardness of 240 to 350 p.p.m., the Stability Index has a value of approximately —0.7 to —0.9, thus indicating that a substantial amount of scale, in absolute value, about 15 mg. per liter of water will be deposited from the water which is being recirculated.

Curve II denotes the Stability Index of the same inlet water which is treated by adding thereto the following solid formulation:

|  | P.p.m. |
|---|---|
| Phosphate | 4 |
| Sodium lignin sulfonate | 8 |
| Sulfamic acid | 48 |

It will be seen that the amount of phosphate and organic protective compound is the same as in the first example. To this solid mixture is added the solid sulfamic acid. The proper amount of this solid admixture is then introduced in discrete amounts and over an extended period of time, into the recirculating water.

As the hardness of the water increases during continued recirculation to the 240–350 p.p.m. hardness range, the Stability Index is still negative, but substantially less negative than in curve I. The Stability Index value in the hardness range of primary interest 240–350 p.p.m. is —0.4 to —0.5, whereas the index has a reading of —0.7 to —0.9 for the water of curve I. The alkalinity is reduced from 120 p.p.m. to 80 p.p.m. by the sulfamic acid polyphosphate-protective compound treatment.

Referring now to curve III, the Stability Index is plotted for the same water treated as described with reference to curve I, and which also has added thereto 108 p.p.m. of sulfamic acid. The alkalinity is thus reduced to 40 p.p.m., and in the critical range of 240 p.p.m. to 350 p.p.m., the Stability Index varies only between +0.2 and —0.1. That is to say, the scale-forming tendency of the polyphosphate-lignin treated water is very substantially reduced merely by the addition of the proper amount of solid sulfamic acid. Manual feeding equipment, whereby specified amounts of the solids are preferably injected into the recirculating line of the evaporative system, are extremely simple and can be installed for a few dollars. In contrast to this, a liquid metering device, handling strong acids, such as sulfuric or muriatic acids, costs hundreds of dollars.

The curves II and III described above are substantially found to be repeated when citric acid is substituted for sulfamic acid. However, approximately 50% more citric acid than sulfamic acid must be used to achieve equivalent results.

Other solid acids that are practical and may be successfully used are listed below:

Boric acid ($H_3BO_3$)
Sodium acid sulfate ($Na_2HSO_4$)
Trichloroisocyanuric acid

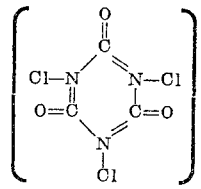

The amount of solid acid to be added depends mainly upon the initial alkalinity in the water entering the evaporative system. Generally, the initial alkalinity of the inlet water falls within the range of 100 to 200 and the amount of solid acid necessary to prevent scale-deposition in the manner shown by curve III must be sufficient to reduce the alkalinity of the initial inlet and make-up water to between 20 and 80. Preferably, the amount of solid acid to be added must be such as to reduce the alkalinity of the initial inlet water and make-up water to between 20 and 60.

In addition to the polyphosphate and/or organic protective agents, other solid scale-deposition inhibitors that can be successfully used with the solid acids are the sodium salts of ethylenediaminetetraacetic acid.

Further examples of the preferred solid acid-polyphosphate combination, and of the preferred solid acid-polyphosphate-organic protective agent combination are listed below. These combinations all result in a Stability Index approximately equivalent to curve III above in the 240 p.p.m. to 350 p.p.m. range of hardness, when the initial hardness of the inlet water is 80 p.p.m., and its alkalinity initially is 120 p.p.m.

|  | P.p.m. |
|---|---|
| Example 1. Sodium hexametaphosphate $(NaPO_3)_6$ | 6 |
| Solid acid-sulfamic | 8.5 |
| Example 2. Sodium tetraphosphate $(Na_6P_4O_{13})$ | 8 |
| Solid acid-citric | 125 |
| Example 3. Complex phosphate $(Na_9P_7O_{22})$ | 5 |
| Tannin | 10 |
| Sulfamic acid | 75 |
| Example 4. Tetrasodiumpyrophosphate $(Na_4P_2O_7)$ | 5 |
| Sodium lignin sulphonate | 30 |
| Citric acid | 100 |
| Example 5. Complex phosphate | 5 |
| Tannin | 10 |
| Solid acid-boric | 115 |
| Example 6. Sodium lignin sulphonate | 25 |
| Sulfamic acid | 85 |

The preferred amounts of polyphosphate added to the inlet water ranges between about 1 and 10 p.p.m. Below 1 p.p.m., the polyphosphate addition does not have any substantial effect, and above 10 p.p.m., actual precipitation takes place within the equipment, and is therefore usually undesirable.

The preferred amount of protective agent added to the inlet water ranges between about 1–30 p.p.m., there not being any substantial benefit derived below the lower amount, and little additional benefit gained by using more than 30 p.p.m. A corrosion-inhibiting compound of the chromate, or other conventional type is preferably added to any of the above formulations.

While several embodiments of my invention have been described, it will be understood that changes and modifications may be made that lie within the scope of my invention. Hence I do not intend to be bound by the specific embodiments but only by the appended claims.

I claim:

1. A process for reducing the amount of scale deposition in an evaporative cooling system which comprises adding to the water in said system a sodium polyphosphate in an amount of from 1 to 10 parts per million, and also adding to said water an amount of sulfamic acid sufficient to reduce the alkalinity of the water being fed to said system to a value between 20 and 80 parts per million, calculated as calcium carbonate.

2. A process for reducing the amount of scale deposition in an evaporative cooling system which comprises adding to the water in said system a sodium polyphosphate in an amount of from 1 to 10 parts per million, a sodium lignin sulfonate in an amount of from 1 to 30 parts per million, and also adding to said water an amount of sulfamic acid sufficient to reduce the alkalinity of the water being fed to said system to a value between 20 and 80 parts per million, calculated as calcium carbonate.

References Cited in the file of this patent

UNITED STATES PATENTS

| | | | |
|---|---|---|---|
| 2,148,006 | Arveson | | Feb. 21, 1939 |
| 2,264,103 | Tucker | | Nov. 25, 1941 |
| 2,505,457 | Bird | | Apr. 25, 1950 |
| 2,709,522 | Osborne | | May 31, 1955 |
| 2,711,391 | Kahler | | June 21, 1955 |
| 2,777,818 | Gambill | | Jan. 15, 1957 |

FOREIGN PATENTS

| | | |
|---|---|---|
| 191,449 | Great Britain | Jan. 10, 1923 |
| 200,370 | Great Britain | July 12, 1923 |

OTHER REFERENCES

Cook: "Combustion," March 1956, pages 53–56.

Helwig et al.: "Oil and Gas Journal," vol. 55, Dec. 2, 1957, pages 101 and 103–106.

Cupery: "Industrial and Engineering Chemistry," vol. 30, No. 6, June 1938, pages 627 to 630.

"Chemical Engineering" (periodical), June 1956, page 142.